United States Patent [19]

Achiha

[11] Patent Number: 4,626,891

[45] Date of Patent: Dec. 2, 1986

[54] MOTION DETECTING CIRCUIT UTILIZING INTER-FRAME DIFFERENCE SIGNALS OF SUCCESSIVE FIELDS

[75] Inventor: Masahiko Achiha, Iruma, Japan

[73] Assignee: Hitachi, Ltd., Tokyo, Japan

[21] Appl. No.: 633,273

[22] Filed: Jul. 23, 1984

[30] Foreign Application Priority Data

Jul. 25, 1983 [JP] Japan ................................. 58-134326
Sep. 9, 1983 [JP] Japan ................................. 58-164988

[51] Int. Cl.[4] ............................................ H04N 9/00
[52] U.S. Cl. .................................... 358/21 R; 358/11; 358/105
[58] Field of Search ...................... 358/11, 21 R, 105

[56] References Cited

U.S. PATENT DOCUMENTS 4,288,815  9/1981  Miles .................................... 358/105
4,530,004  7/1985  Achiha et al. ......................... 358/11

Primary Examiner—John W. Shepperd
Attorney, Agent, or Firm—Antonelli, Terry & Wands

[57] ABSTRACT

A motion detecting circuit suitable for detecting object-movement on an interlaced TV signal includes at least three field memories, subtracters, absolute circuits and an adder circuit. The motion detector evaluates object-movement by accumulating frame difference signals between adjacent fields.

10 Claims, 13 Drawing Figures

MOTION DETECTING CIRCUIT UTILIZING INTER-FRAME DIFFERENCE SIGNALS OF SUCCESSIVE FIELDS

The present invention relates to a motion detecting circuit and particularly to a circuit for detecting motion of a picture in a television signal. Specifically, the present invention relates to a circuit for deriving information as to motion of an object included in an interlaced scanning television signal.

In the interlaced scanning television picture, there occurs a disturbance such as flicker on the horizontal stripes of characters or the like. To avoid that kind of disturbance, there is a system in which scanning lines are interpolated and two fields of scanning lines are displayed at the same time, without performing inter-lace-scanning, thereby providing sequentially scanning television picture. In this case, the signal for interpolated scan lines is obtained from a signal in a preceding field. In the case of a stationary object, a high picture quality with no flicker can be displayed in the above-mentioned system. If the object moves, however, both the pictures in the field 1/60 seconds before and in the present field are displayed in an overlapped fashion, the edge of the moving portion of the picture becomes comb-like to deteriorate the picture quality.

To avoid the aforementioned disturbance which causes deterioration in picture quality, a system has been tried in which information as to the motion of an object is derived from a television signal, and in the moving picture portion, an interpolated scan line signal is formed from a mean value of two adjacent scanning lines of the picture in the present field, instead of performing interpolation from the preceding field.

The circuit for detecting motion of an object in a television signal is used also in an inter-flame coding device, a recursive noise reducer, a luminance/chrominance signal separation circuit besides the above-mentioned scan line interpolation circuit.

Conventionally, the motion detecting circuit for an object in a television signal is arranged such that a frame memory is employed and a difference signal between a present picture element signal and a picture element signal on the same position two fields (one frame) before to thereby judge that the picture is a stationary one when the different signal is small, while a moving one when the different signal is large. In such a motion detecting circuit, however, an object which is actually moving is sometimes misjudged to be a stationary one for the reason as described later in detail.

Furthermore, in the case of a composite color television signal, such as an NTSC color television signal, in which a color difference signal is modulated by a sub-carrier and superimposed onto a luminance signal, the phase of the subcarrier is different between frames and a modulated color signal as well as motion information leak into an inter-frame difference signal so as to make it difficult to get sufficiently correct motion information.

The main object of the present invention is to provide a motion detecting circuit in which the motion of an object can be detected in spite of the motion speed of the object of the interlaced television signal.

Another object of the present invention is to provide a circuit for accurately detecting the motion of an object of an interlaced composite color television signal.

To attain the above-mentioned objects, according to the present invention, the motion detecting circuit comprises a plurality of memories connected in series such that the sum of the capacities of the memories corresponds to at least three fields of the television signal, an operation circuit for receiving a signal from an input/output terminal of the plurality of memories, the operation circuit including a subtracting circuit for obtaining an inter-frame difference signal, and a circuit for checking the inter-frame difference signals with respect to two succeeding fields so as to produce a signal indicating existence of movement when the inter-frame difference signal of either one of the two succeeding fields has a value which is equal to or larger than a predetermined value.

The above-mentioned and other features and objects of the present invention will become apparent by reference to the following description taken in conjunction with the accompanying drawings, in which.

For the easy understanding of the operation and arrangement of preferred embodiments of the present invention, the construction of a television signal, the prior art, and the principle of the present invention will be described hereunder.

Figure 1:
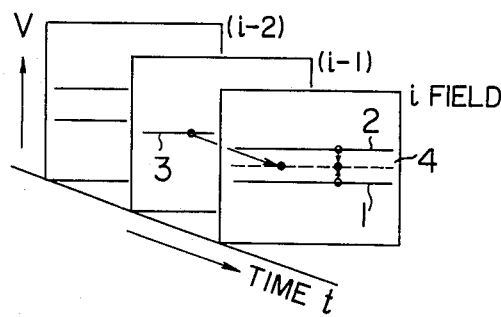
FIG. 1 is a diagram showing a three-dimensional model of a picture of a television signal.
Figure 2:
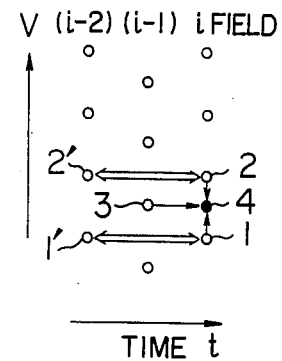
FIG. 2 is a diagram showing scanning lines of a television signal on the time and vertical domain, for explaining the conventional motion adaptive scan line interpolation processing.

FIG. 1 shows successively transmitted three fields of television pictures ((i-2), (i-1) and i field). The number of total scanning lines in each field of picture is 525/2 because of interlaced scanning, and in the drawing, a part of the scanning lines is shown by solid lines (1, 2, 3). Now assume that sequentially scanned television pictures each including 525 scanning lines are formed from such interlace-scanned television pictures by doubling the scanning lines thereof. An interpolated scanning line 4 for this purpose is shown with a broken line. The signal for such an interpolated scanning line is interpolated with the scanning line 3 at the same position in the vertical direction (direction V) in the previous field (i-1) when the picture is a stationary one, while interpolated with the mean value of the adjacent upper and lower scanning lines 1 and 2 in the same field i when the picture is a moving one. FIG. 2 shows the manner of this interpolation with the axis representing time t and the vertical position V, in which the white dots represent interlaced scanning lines and the black dot an interpolated scanning line. The numerals 1, 2, 3 and 4 represent the same scanning lines as shown respectively in FIG. 1.

As conventionally known, as shown in FIG. 2 with a thick arrow, the movement of an object is detected in such a manner that a present scanning line (1, 2) of field i is compared with a scanning line (1', 2') of field (i-2) at the same position two fields before so as to determine the picture as a stationary one when there is a small difference, while to determine it as a moving one when there is a large difference therebetween. According to the result of comparison, the signal of the interpolated scanning line 4 is obtained selectively from the scanning line 3 in the previous field (i-1) or from the mean value of the scanning lines 1 and 2 in the present field i.

Figure 3:
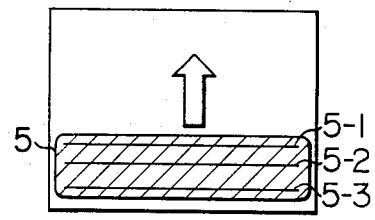
FIGS. 3 and 5 are diagrams showing picture images in the television picture screen.
Figure 4:
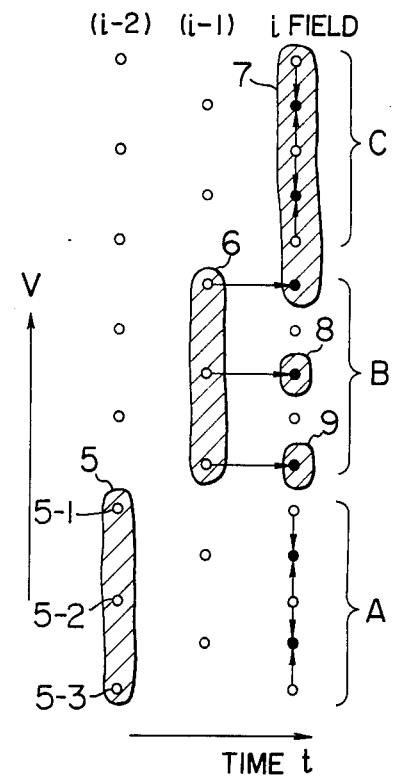
FIG. 4 is a diagram showing scanning lines on the time and vertical domain, for explaining the conventional scanning line interpolation processing.
Figure 5:
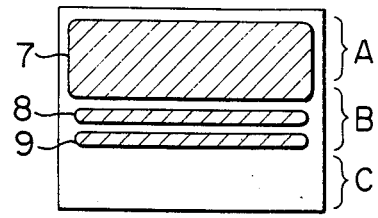

Assume now that in the above-mentioned signal processing, for example, such a picture as shown in FIG. 3, that is a black object 5 consisting of three scanning lines 5-1, 5-2, and 5-3, is moving up. This case is illustrated in FIG. 4 by a diagram with axis of time t and the vertical position V. FIG. 4 shows that the object is moving up at the rate of three scanning lines per field period. In this case, the picture of field i is regarded as a moving one in the regions A and C because there is a difference between the scanning line in the present field i and the corresponding scanning line in the previous frame so that the scanning line is interpolated with a mean value of the directly upper and lower scanning lines in the same field and adjacent to the scanning line to be interpolated as seen in the drawing, while in the region B, the picture is determined to be a stationary one because the respective values of the scanning lines in the i and the (i-2) fields are equal to each other so that the interpolation is attained with a corresponding scanning line in the (i-1) field. Thus, in the region B, the scanning line of black picture in the (i-1) field is interpolated into the light background in the i field. As the result, in the successively scan-coverted picture in the i field, as shown in FIG. 5, there is a black picture portion in the region C at the upper portion of the field, while in the lower portion, that is in the region B, black picture portions 8 and 9 appear every other line, resulting in deterioration in picture quality.

Figure 6:
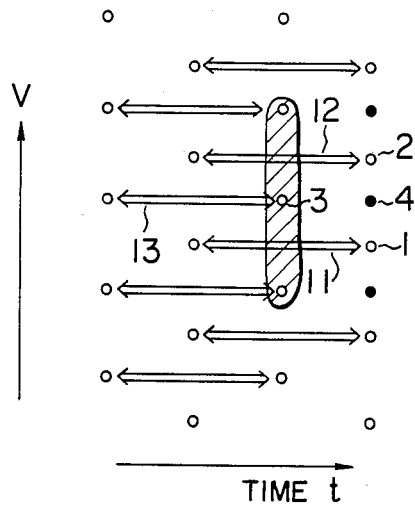
FIGS. 6 and 7 are diagrams showing scanning lines on the time and vertical domain to explain the principle of the present invention.

Now referring to FIG. 6, the principle of an embodiment of the present invention will be described hereunder. FIG. 6 shows the arrangement of scanning lines of successive four fields with the axis of time t and the vertical position V, corresponding to the region B in FIG. 4. The interpolation mode of the interpolated scanning line 4 is such that not only the respective inter-frame difference signals 11 and 12 as to the scanning lines 1 and 2 in the present field but the inter-frame difference signal 13 as to the scanning line 3 in the same position in the previous field are considered so that when all the three inter-frame difference signals are small, the picture is determined to be a stationary one and thus the signal of the interpolated scanning line 4 is interpolated from the scanning line 3 in the previous field (i-1), while in the other case the picture is determined to be a moving one and the interpolation is performed with the mean value of the upper and lower scanning lines 1 and 2 in the same field i and adjacent to the interpolated line. In the illustrated case, the picture is determined to be a moving one because the inter-frame difference signal 13 is large while both the inter-frame difference signals 11 and 12 are small and the interpolation scanning line 4 is interpolated with the mean value of the scanning lines 1 and 2. As the result, there occurs no deterioration in picture quality unlike the case of FIG. 5 which occurs due to the improperly interpolated scanning lines 8 and 9.

In the embodiment of FIG. 6, the picture signals of i and (i-1) fields are used to obtain the signal of the interpolated scanning line in the i field. On the other hand, the signals of the (i-1), (i-2), and (i-3) fields are used for the purpose of detection as to whether the picture is a moving one or not in order to changeover the interpolation processing mode. For this, there is a large offset in time between the judgement as to whether the picture is a stationary one or a moving one and the interpolation processing, resulting in a case where proper processing can not be performed to cope with the result of detection.

Figure 7:
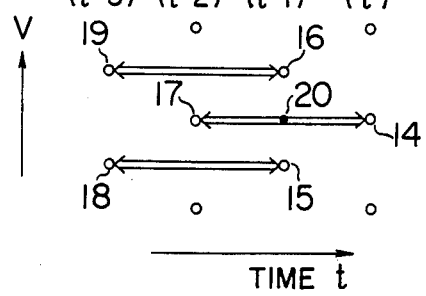

If the interpolation processing for the (i-1) field is performed by using the results of stationariness/movement judgement with respect to the (i-3) to i fields, the signals in the (i-2) and (i-1) fields are used for the interpolation processing and the signals in the (i-3) and i fields adjacent to the (i-1) field are used so that the time offset between the stationariness/movement judgement and the interpolation processing using the results of the judgement is so small that proper processing can be effected to cope with the results of the judgement. That is, in FIG. 7, if the stationariness/movement is judged as to the signal of the interpolated scanning line 20 in the (i-1) field by using the inter-frame difference signals between the scanning lines 14 and 17, 15 and 18, 16 and 19, the maximum time interval is two field-periods so as to minimize the time offset between the interpolation operation and the stationariness/movement judgement.

Figure 8:
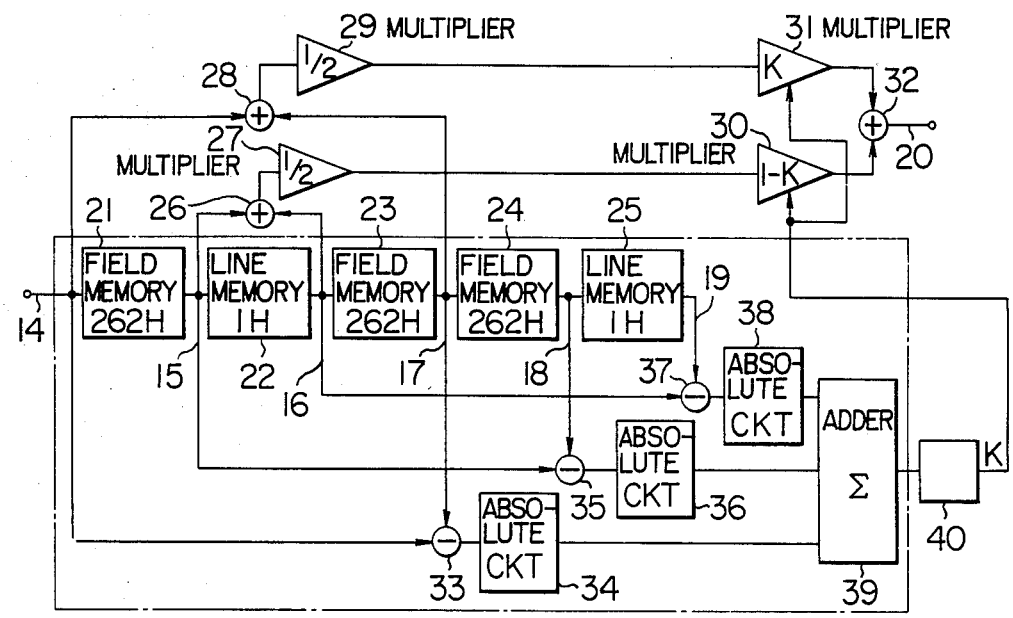
FIG. 8 is a diagram showing the arrangement of the scan line interpolation processing circuit as an embodiment of the motion detecting circuit according to the present invention.

FIG. 8 shows the arrangement of an embodiment of a scanning line interpolation circuit using the movement detecting circuit according to the present invention. In FIG. 8, the part encircled by a broken line is the circuit for detecting the movement of an object. In the movement detecting circuit, the signal for the interpolation scanning line 20 is obtained, on the basis of the principle as described above as to FIG. 7, by properly changing the mixture ratio of the mean value of the scanning lines 14 and 17 to the mean value of the scanning lines 15 and 16 by means of a movement coefficient k ($0 \leq k \leq 1$) obtained by the results of stationariness/movement judgement. In the circuit, three field memories 21, 23, and 24 each having a capacity of 262H (H represents the period of one horizontal scanning line) and line memories 22 and 25 each having a capacity of 1H are connected in series. That is, a plurality of memories including three field memories are connected in series. A luminance signal (it may be a monochromatic television signal or a low frequency component of a color television signal) is applied to the input terminal. Assuming that the television signal 14 applied to the input terminal is the signal of the scanning line 14 in FIG. 7, the respective outputs of the memories 21, 22, 23, 24, and 25 are the signals of the scanning lines 15, 16, 17, 18, and 19 in FIG. 7, as indicated with the same reference numerals in FIG. 8. Thus, a subtracter 33 produces an inter-frame difference signal (17)-(14) as to the scanning lines 14 and 17, a subtracter 35 produces an inter-frame difference signal as to the scanning lines 15 and 18, and a subtracter 37 produces an inter-frame difference signal as to the scanning lines 16 and 19, respectively. Absolute circuits 34, 36, and 38 respectively indicate with absolute values the inter-frame difference signals produced by the subtracters 33, 35, and 37. An adder 39 adds the respective outputs of the absolute circuits 34, 36, and 38. A coefficient conversion circuit 40 is for changing the value of the coefficient k in accordance with the output of the adder 39. The movement coefficient k controls construction of the interpolated scanning line in such a manner as described hereunder.

A mean value of the scanning lines 14 and 17 is formed by an adder 28 and a coefficient circuit 29 for multiplying by a coefficient of ½ and a mean value of the scanning lines 15 and 16 is formed by an adder 26 and a coefficient circuit 27 for multiplying by a coefficient of ½. Each output of the coefficient circuits 29 and 27 is multiplied by k and (1−k) respectively by multiplying circuits 31 and 30 and the respective outputs of the multiplying circuits 31 and 30 are added by an adder 32 so as to obtain an interpolation scanning line signal corresponding to the movement of the picture. In the drawing, the signal $V_{20}$ of the interpolation scanning line 20 is expressed by the following equation:

$$V_{20} = k \cdot \frac{V_{14} + V_{17}}{2} + (1 - k) \cdot \frac{V_{15} + V_{16}}{2}$$

where $V_{14}$, $V_{15}$, $V_{16}$, and $V_{17}$ represent the respective signal of the scanning lines 14, 15, 16 and 17. The coefficient k is changed by the motion detecting circuit so as to approach 1 in a stationary picture portion while to approach 0 in a moving picture portion.

Although the coefficient k can take various values between 1 and 0, sometime it is restricted to two values, 1 and 0 in order to omit the multiplying circuits 30 and 31 to simplify the arrangement of the circuit. In this case, not only the multiplying circuits 30 and 31 can be omitted but the adder 32 can be replaced by a switch. Further, the adder 39 and the coefficient conversion circuit 40 may be omitted by logically adding the respective results of stationariness/movement judgement as to the absolute value signals of the inter-frame difference signals (respective output signals of the absolute circuits 34, 36, and 38).

According to the above embodiment, since the motion information as to an interlaced picture is extracted from an inter-frame difference signal between two successive fields, the deterioration in picture quality due to misprocessing on the basis of misjudgement of a moving picture portion as a stationary picture portion so that a proper scanning line interpolation processing can be performed without occurring deterioration in picture quality.

Figure 9:
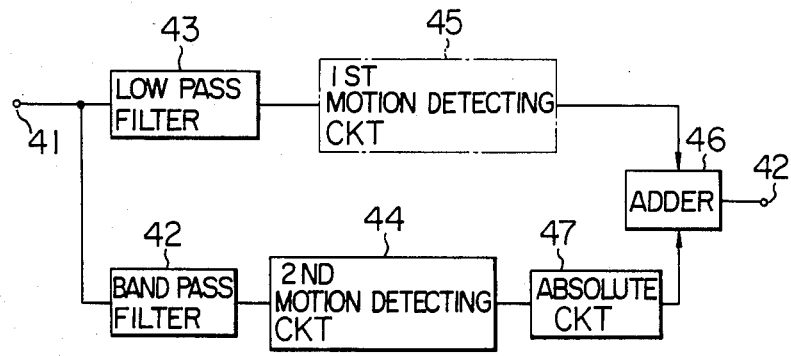
FIG. 9 is a diagram showing the arrangement of another embodiment of the motion detecting circuit according to the present invention.

FIG. 9 is a diagram showing the arrangement of another embodiment of the motion detecting circuit according to the present invention. The motion detecting circuit shown in FIG. 8 by encircling with a broken line is effective in the case where the input television signal is a monochromatic one or a composite color television signal including no chrominance signal. In the case of such a composite color television signal as an NTSC television signal in which a color difference signal is modulated with a subcarrier and superimposed onto a luminance signal, not only the motion information but a modulated chrominance signal may enter the inter-frame difference signal so that correct motion information can not be obtained because the subcarrier which modulates the color difference signal is different in phase between frames. Accordingly, in the embodiment of FIG. 9, a composite color television signal applied to an input terminal 41 is divided into a low frequency component having no carrier chrominance component and a modulated chrominance signal component by a low pass filter (LPF) and a band pass filter (BPF) respectively, and the low frequency component is applied to a first motion detecting circuit 45 which is similar to the motion detecting circuit described above with respect to FIG. 8. The modulated chrominance signal component is applied to a second motion detecting circuit 44, various embodiments of which are illustrated in FIGS. 10A, 10B, 10C, and 10D. The output of the second motion detecting circuit 44 is applied to an adder 46 through an absolute circuit 47 and added to the output of the first motion detecting circuit 45 in the adder 46. The output of the adder 46 is produced through an output terminal 42 as the general motion information as to a picture.

The second motion detecting circuit 44 includes a memory having a capacity capable of storing at least three fields of pictures, whereby the motion information as to a picture can be extracted in accordance with the value of an inter-frame difference signal as to inter-field difference signal (or absolute value signals thereof) between two fields in which the respective subcarriers are in phase. That is, in an NTSC color television signal, the polarity of the subcarrier is inverted every horizontal scanning period H, so that no difference signal appears in a stationary picture portion except at an edge portion at which picture changes abruptly, when a difference is to be obtained between a present signal and a previous field signal delayed 262H. Thus, this inter-field difference signal may include the picture motion information as well as a high frequency vertical component of a stationary picture. If an inter-frame difference signal is calculated from the inter-field difference signal, the high frequency vertical component of a stationary picture can be cancelled and correct motion information can be derived.

Figure 10A:
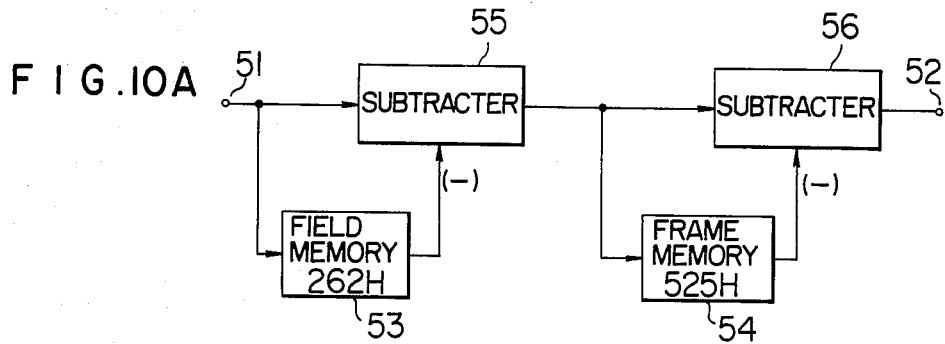
FIGS. 10A, 10B, 10C and 10D are diagrams showing the arrangement of various embodiments of the block 44 shown in FIG. 9.

In the circuit as shown in FIG. 10A, a composite color television signal applied to an input terminal 51 is subtracted in a subtracter circuit 55 from the output signal of a field memory 53 having a capacity of 262H. That is, the subtracter circuit 55 produces an inter-field difference signal. In an NTSC color television signal, the polarity of the modulated chrominance signal is inverted every horizontal period H, and the present scanning line and the scanning line delayed 262H are the same in polarity. As the result, the output of the subtracter 55 is zero in a stationary picture portion where no abrupt level change in the vertical direction appears, while a significant difference signal appears at the output of the subtracter 55 in a moving picture and in a stationary picture portion where an abrupt change in the vertical direction exists. This difference signal is delayed in a frame memory 54 and an inter-frame difference signal between the respective outputs of the subtracter circuit 55 and the frame memory 54 is calculated in a subtracter circuit 56. Being the same in every frame, the component of the vertical level change of a stationary picture is cancelled in the inter-frame difference signal, so that only the moving picture component appears at an output terminal 52.

Figure 10B:
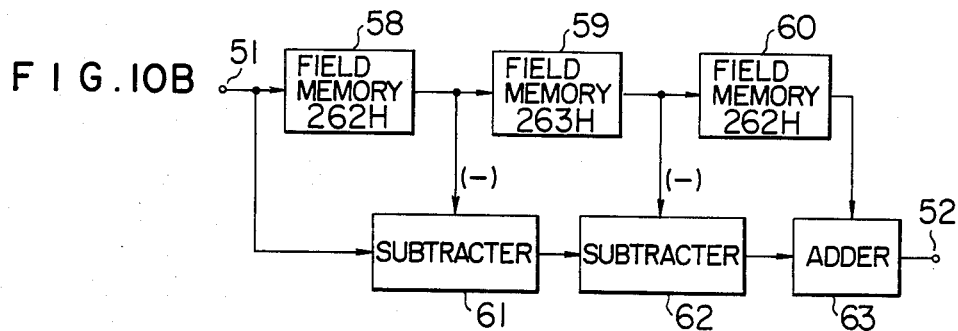

The motion detecting circuit of FIG. 10B is for obtaining the inter-frame difference signal as to an inter-field difference signal, similarly to the circuit of FIG. 10A. The circuit of FIG. 10B includes field memories 58, 59, and 60 connected in cascade to an input terminal 51 and having capacities of 262H, 263H, and 262H respectively, a subtracter circuit 61 for obtaining the difference signal between the input and output of the field memory 58, a subtracter circuit 62 for obtaining the difference signal between the respective outputs of the subtracter circuit 61 and the field momory 59, an adder 63 for adding the respective outputs of the subtracter circuit 62 and the field memory 60.

Figure 10C:
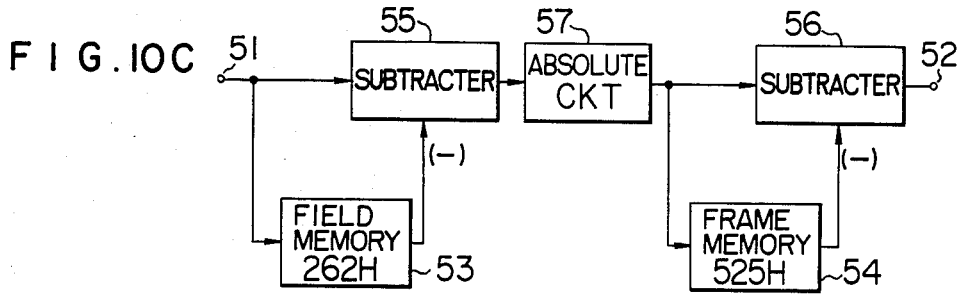

The circuit of FIG. 10C is a modification of the circuit of FIG. 10A in which an absolute circuit 57 is added to the output portion of the subtracter 55. In this circuit, an absolute value of the inter-field difference signal is calculated and if the thus obtained absolute values are equal between frames, it is judged that there exists no picture movement. In this manner, such a misjudgement that a stationary picture is misjudged as a moving picture at a portion of the stationary picture where an abrupt color change exists in the vertical direction can be prevented from occurring.

Figure 10D:
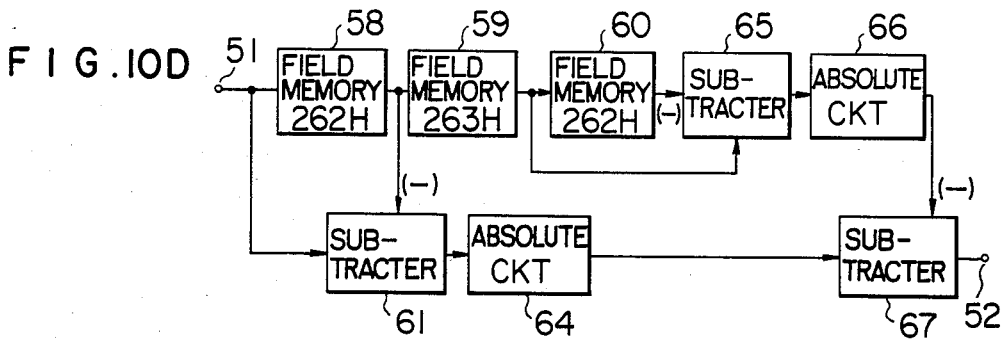

The circuit of FIG. 10D is a modification of the circuit of FIG. 10B, and includes field memories 58, 59, and 60 connected in cascade to an input terminal 51, a subtracter circuit 61 for obtaining the difference signal between the input and output of the field memory 58, a subtracter circuit 65 for obtaining the difference signal between the input and output of the field memory 60, absolute circuits 64 and 66 connected to the respective outputs of the subtracter circuits 61 and 65, and a subtracter circuit 67 for obtaining the difference between the respective outputs of the absolute circuits 64 and 66 so as to obtain an inter-frame difference signal as to the inter-field difference signal. The function of the absolute circuits 64 and 66 are the same as the absolute circuit 57 of FIG. 10C.

Although the motion detecting circuit of each of FIGS. 10A, 10B, 10C and 10D is illustrated in the case where the motion detecting circuit is connected to the first motion detecting circuit 45 of FIG. 9, it can detect the picture motion independently of the first motion detecting circuit 45 if deterioration in accuracy is allowed at an extent.

I claim:

1. A motion detecting circuit for detecting the motion of an object in an interlaced television signal comprising:
    an input terminal to which the interlaced television signal is applied;
    a plurality of memories connected in series to said input terminal, the sum of capacities of said plurality of memories corresponding to at least three fields;
    a first circuit for calculating at least two inter-frame difference signals of successive fields from said plurality of memories; and
    a second circuit for determining the motion of said object by utilizing the output of said first circuit.

2. A motion detecting circuit according to claim 1, wherein said interlaced television signal applied to said input terminal is a monochrome signal or a low frequency signal of a color television signal.

3. A motion detecting circuit according to claim 2, wherein said color television signal is an NTSC color television signal.

4. A motion detecting circuit according to claim 3, wherein said plurality of memories are a first, a second, a third, a fourth, and a fifth memories connected in series in the mentioned order and having 262H, 1H, 262H, 262H, and 1H, said H being a capacity of a scanning line; wherein said first circuit includes a first subtracter for obtaining the difference between an input signal to said first memory and the output of said third memory, a second subtracter for obtaining the difference between the respective outputs of said first and fourth memories, a third subtracter for obtaining the difference between the respective outputs of said second and fifth memories, and a plurality of absolute value circuits connected to said respective subtracters.

5. A motion detecting circuit according to claim 2, further comprising a band pass filter for extracting a high frequency component of said color television signal including a chrominance subcarrier, a third circuit for receiving the output of said band pass filter and for obtaining one of an inter-field difference signal of high frequency component of said color television signal and an absolute value of said inter-field difference signal, and for obtaining one of an inter-frame difference signal of said inter-field difference signal and an inter-frame difference signal of said absolute value of said inter-field difference signal, and a fourth circuit for producing motion information of the object on the basis of the respective outputs of said second and third circuits.

6. A motion detecting circuit according to claim 5, wherein said third circuit includes a first subtracter for obtaining the difference between the output of said filter and a signal obtained by delaying said output of said filter by one field, and a second subtracter for obtaining the difference between the output of said first subtracter and a signal obtained by delaying said output of said second subtracter by one frame.

7. A motion detecting circuit according to claim 5, wherein said third circuit includes a first subtracter for obtaining the difference between the output of said filter and a signal obtained by delaying said output of said filter by one field, and a first absolute circuit for obtaining an absolute value of the output of said first subtracter, and a second subtracter for obtaining the difference between the output of said first absolute circuit and a signal obtained by delaying said output of said first absolute circuit by one frame.

8. A motion detecting circuit according to claim 5, wherein said third circuit includes a series connection of a first, a second, and a third field memories having delay times of 262H, 263H and 262H, respectively, said series connection having an input connected to the output of said filter, a first subtracter for obtaining the difference between the input and output of said first field memory, a second subtracter for obtaining the difference between the respective outputs of said second field memory and said first subtracter, and an adder for obtaining the sum of the respective outputs of said third field memory and said second subtracter.

9. A motion detecting circuit according to claim 5, wherein said third circuit includes a series connection of a first, a second and a third field memories having delay times of 262H, 263H and 262H, respectively, said series connection having an input connected to the output of said filter, a first subtracter for obtaining the difference between the input and output of said first field memory, a second subtracter for obtaining the difference between the input and output of said third field memory, and a third subtracter for obtaining the different between absolute values of the respective outputs of said first and second subtracters.

10. A motion detecting circuit according to claim 2, wherein said plurality of memories are a first, a second, a third, a fourth, and a fifth memories connected in series in the mentioned order and having 262H, 1H, 262H, 262H, and 1H, said H being a capacity of a scanning line; wherein said first circuit includes a first subtracter for obtaining the differences between an input signal to said first memory and the output of said third memory, a second subtracter for obtaining the difference between the respective outputs of said first and fourth memories, a third subtractor for obtaining the difference between the respective outputs of said second and fifth memories, and a plurality of absolute value circuits connected to said respective subtracters; and wherein said second circuit includes an adder for adding outputs of said plurality of absolute value circuits, and a coefficient conversion circuit for converting the output of said adder to a movement coefficient.

* * * * *